Oct. 14, 1952     S. C. CARNEY     2,614,064
METHOD OF AND APPARATUS FOR LIQUID-LIQUID CONTACTING
Filed Oct. 31, 1949
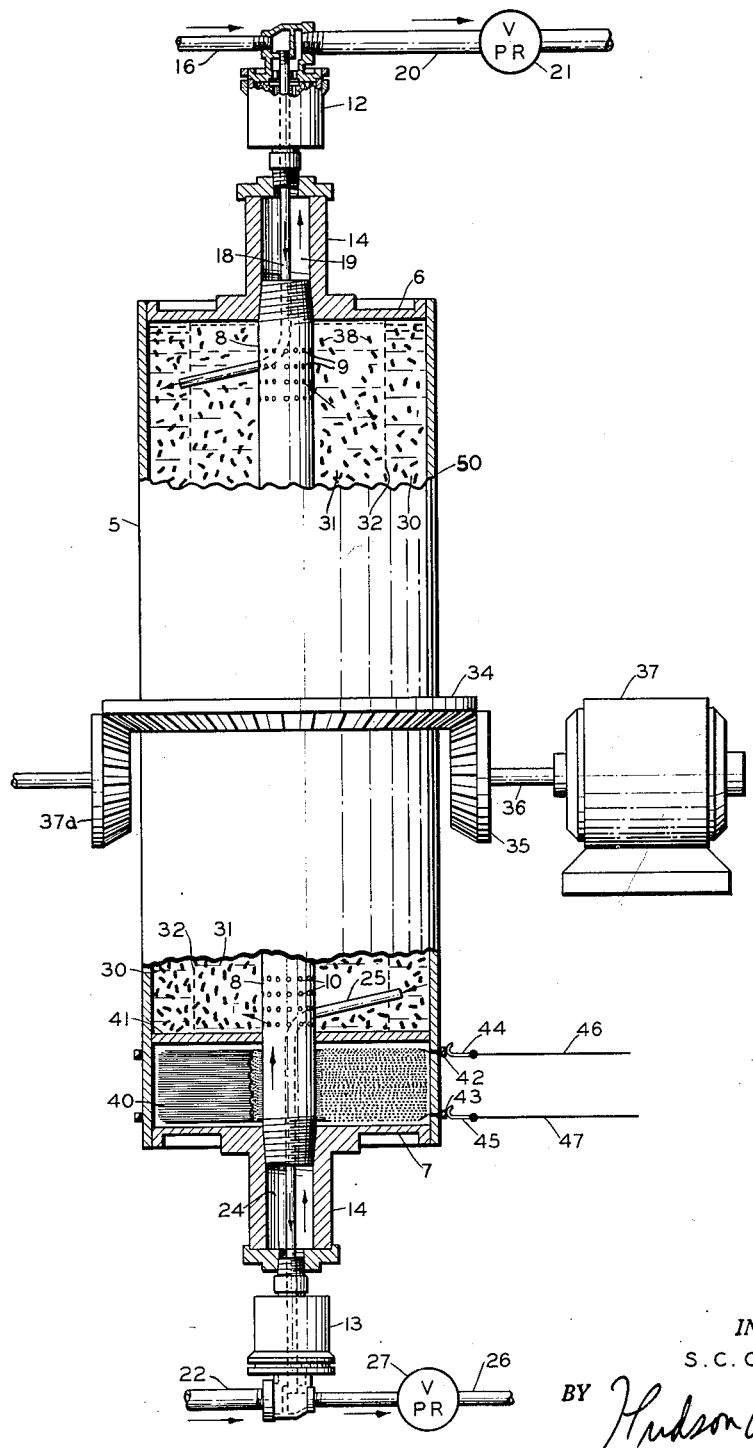
INVENTOR.
S. C. CARNEY
BY Hudson & Young
ATTORNEYS Patented Oct. 14, 1952

2,614,064

UNITED STATES PATENT OFFICE 2,614,064

METHOD OF AND APPARATUS FOR LIQUID-LIQUID CONTACTING

Samuel C. Carney, Bartlesville, Okla., assignor to Phillips Petroleum Company, a corporation of Delaware Application October 31, 1949, Serial No. 124,617

9 Claims. (Cl. 196—14.49)

This invention relates to a method of liquid-liquid contacting and to apparatus for carrying out said method.

There are numerous operations in which two liquid phases are brought into intimate contact for the purpose of purification, separation or reaction. In one type of operation, known as liquid-liquid extraction, two liquid phases are brought into contact for the purpose of separating or extracting one or more of the components of one of the liquids by contact with a second liquid, generally known as the solvent. Such liquid-liquid extraction processes are frequently used for separating various hydrocarbon mixtures, such as close boiling paraffins and naphthenes, which cannot be separated by fractionation. Two liquid phases are also brought into intimate contact in various treating operations in which some impurity, such as hydrogen sulfide, mercaptans or a small amount of an aluminum halide catalyst, is removed from a hydrocarbon mixture. A similar type of operation is also used in various catalytic hydrocarbon conversion processes, such as alkylation, in which the liquid phase hydrocarbon reactants are brought into intimate contact with a liquid phase catalyst so as to produce a reaction.

Liquid-liquid extraction is presently carried out in various types of mechanical mixers, packed columns, and spray towers. Countercurrent contact is obtained in the packed columns and spray towers by dispersing one of the liquids and allowing it to pass through a second liquid known as the continuous phase. If the feed liquid mixture is the dispersed phase and the solvent the continuous phase, the transfer of one or more components of the feed mixture to the solvent is accomplished at the interfacial region of contact between the two liquids, the greater the interfacial contact, the higher the rate of transfer. In spray towers, the transfer between the two phases is accomplished through the interfacial area of the dispersed drops, but the components within the drops must diffuse to the surface before transfer can be made. Furthermore, the portion of the continuous phase adjacent the interface soon becomes saturated or reaches equilibrium with respect to the components which are being extracted and, unless new solvent is continually brought into the area adjacent the interface, it is necessary to rely on diffusion through the solvent. As a result, several feet of tower height are required to obtain an equilibrium extraction stage.

The apparatus of the present invention provides a means for overcoming these difficulties so that several equilibrium extraction stages may be provided within a relatively short contacting zone.

It is an object of this invention to provide a method and apparatus whereby intimate contact may be obtained between the two phases while still permitting countercurrent operation.

It is a further object of this invention to provide means for establishing two separate liquid phases, and to move solid particles repeatedly through the interface between the phases in opposite directions at high velocity, thereby to obtain rapid and efficient contacting.

It is a still further object of this invention to provide apparatus which is of rugged construction, reliable in operation, and has a minimum of moving parts.

Various other objects, advantages and features of the invention will become apparent from the following disclosure and discussion taken in conjunction with the accompanying drawing, in which:

The figure is a vertical sectional view, partially in elevation, of the contacting apparatus of this invention.

Referring now to the drawing in detail, the apparatus comprises an elongated vessel 5, preferably of generally cylindrical shape, which is formed from magnetic material, such as steel. The vessel is provided with spaced end caps 6 and 7, cap 6 being formed from non-magnetic material, such as a high chrome iron, and cap 7 being formed from magnetic material such as steel. Preferably, the member 8 is a solid shaft of magnetic material which is provided with a hollow perforated portion 9 at one end thereof and with a hollow perforated portion 10 at the other end thereof to allow passage of liquids therethrough in the manner to be hereinafter described.

The vessel is supported, in a vertical position, as shown, or horizontal position alternatively by suitable bearings, not shown, on the cylindrical surfaces 14 of the end caps 6 and 7. The pressure joints are of conventional construction, and serve only as means for transferring liquid to the rotating vessel and withdrawing liquid therefrom. In a preferred embodiment of the invention, a heavy liquid inlet 16 communicates through rotary pressure joint 12 with a pipe 18 which passes through shaft 8 and discharges heavy liquid at the peripheral region of the vessel. Light liquid from the central region of the vessel is adapted to pass through the perforations 9, a passage 19 defined by cylindrical member 14, and rotary pressure joint 12 to a light liquid outlet line 20 which is controlled by a pressure regulating valve 21. In similar fashion, a light liquid inlet 22 communicates through rotary pressure joint 13, a passage 24 defined by cylindrical member 14, and the perforations 10 to the central region of the vessel 5. Heavy liquid from the outer region of the vessel passes into a pipe 25 which extends through shaft 8 to discharge liquid through rotary pressure joint 13 to a heavy liquid outlet 26 which is controlled by a pressure regulating valve 27.

In accordance with the invention, I provide means for effecting rotary movement of the light and heavy liquids within the vessel 5 in such fashion as to define a peripheral zone 30 of heavy liquid, and a central zone 31 of light liquid which are separated by a generally cylindrical interface 32. In the preferred embodiment shown, this separation is effected by rotating the casing 5 about its longitudinal axis. To this end, the casing is provided with a gear 34 meshing with a gear 35 mounted on a shaft 36, the shaft being driven by a motor 37. Of course, other expedients may be adopted for obtaining the described rotation of the casing about its longitudinal axis. As shown for convenience, the apparatus is mounted vertically, the weight being mainly supported by gear 35 and by an idler gear 37a. Preferably, however, the apparatus is supported horizontally by bearings cooperating with the members 14, thus removing the load from the pressure joints 12 and 13.

In order to attain efficient contacting between the light and heavy liquid phases, I move magnetic particles in a periodic manner through the interface so that such particles alternately enter the light liquid zone 31 and the heavy liquid zone 30. In this connection, it will be understood that the particles 38 should be formed from a material such as soft iron which is magnetic, but which does not become permanently magnetized. The movement of the solid particles, some of which are shown at 38, from the inner region to the outer region of the vessel 5 is effected by centrifugal force produced by rotation of the casing about its longitudinal axis. In a preferred modification of the invention, the particles are moved in the reverse direction from heavy liquid zone 30 to the light liquid zone 31 by magnetic attraction. To this end, a coil 40, preferably of the solenoid type, is mounted adjacent end cap 7, and a plate 41 of non-magnetic material is mounted between the shaft 8 and the casing just above the upper surface of the coil. Electrical energy, either low frequency alternating current or pulsating direct current, is supplied to the coil by conductors, as shown, leading to slip rings 42, 43 which cooperate, respectively, with brushes 44, 45 and conductors 46, 47. The magnetic parts of the apparatus provide a complete circuit for the magnetic flux of the coil, this circuit extending upwardly through the casing 5, radially inward through the portions of the vessel between casing 5 and magnetic member 8, thence downwardly through the magnetic member 8 to the central region of the coil. Accordingly, when the coil is energized, the magnetic particles 38 are moved radially inward from the zone of heavy liquid through the interface to the zone of light liquid. It will be understood that other arrangements and magnetic circuits may be utilized for producing a similar result. For example, a second solenoid may be mounted adjacent end cap 6 which is so poled as to produce a magnetic field reinforcing the field produced by solenoid 40. Also the solenoids may be replaced by a series of electromagnets spaced longitudinally along the shaft, alternate electromagnets being of opposite polarity and having their active surfaces spaced relatively close to the interface. In this case, if desired, the interface may be somewhat closer to the outer wall of the vessel 5.

The operation of the apparatus will be described in connection with the extraction of impurities from a hydrocarbon mixture by a relatively heavy liquid, such as furfural. The furfural is introduced through inlet 16 and flows downwardly through the peripheral region of the vessel to pipe 25 which communicates with outlet 26. The light hydrocarbon mixture introduced through inlet 22 flows into the central region of the vessel through perforations 10, after which it flows upwardly through the central region of the vessel to the perforations 9 and is discharged through outlet 20. As the liquids are introduced in this manner, the casing 5 is rotated at a high rate of speed about its longitudinal axis. As a result, the interface 32 is established between inner zone 31 of light hydrocarbon mixture and outer zone 30 of heavy furfural, the furfural flowing downwardly through the peripheral region of the vessel and the hydrocarbon mixture flowing upwardly through the central region of the vessel.

The location of the interface 32 may be varied by changing the rate of feed or back pressure of the components to be mixed. For example, on one hand, if the back pressure at outlet 26 is increased by adjustment of valve 21, the proportion of light liquid in the vessel is increased and the cylindrical interface 32 moves outwardly toward the periphery of the vessel. On the other hand, if the back pressure at outlet 27 is increased, the proportion of heavy liquid in the vessel is increased and the interface 32 moves inwardly toward the center of the vessel. Thus, the pressure regulating valves permit the location of the interface to be accurately controlled.

With the vessel rotating, and the interface between the furfural hydrocarbon mixture formed as described, coil 40 is periodically energized by application of current through leads 46 and 47. As a result, during each period of energization of the coil 40, the magnetic particles 38 are forced at high velocity from the heavy liquid zone 30 through the interface 32 to the light liquid zone 31. When the particles are located in zone 30, a film of furfural is formed thereon and this film is plunged into the body of hyrocarbon mixture as the particles move through the interface. When the coil 40 is de-energized, the particles 38 are moved at high velocity from the central zone 31 of hydrocarbon material through the interface 32 to the outer zone 30 of furfural. This movement is effected by the centrifugal force produced by rotation of the vessel 5. In the zone 31, the film of heavy liquid is removed from the particles and replaced by a film of light liquid which, in turn, is plunged into the heavy liquid as the particles 38 move radially outward through interface 32. Accordingly, it will be apparent that a very thorough and efficient contacting action is attained. This results from the fact that the surface area of the magnetic particles is large, as compared to their volume, so that a large surface of contact is obtained by the periodic movement of the particles through the interface.

It will also be apparent that the extraction is carried out in a countercurrent manner. Thus, the contaminated hydrocarbon mixture introduced at the bottom of the vessel is contacted with furfural which has passed downwardly through the entire vessel 5 and thereby taken up a considerable proportion of impurities. At the top of the vessel, the relatively pure hydrocarbon mixture still containing a small quantity of impurities is contacted with the pure furfural admitted through inlet 16 and conduit 18.

The vessel may be lined with resilient material to protect it against abrasion, and the magnetic particles may be coated with protective material both to resist abrasion and to control their density. The particles may be of any suitable size and of any suitable density and may be non-uniform in these respects. In some cases, a portion of the particles may be surfaced with material selectively wetted with one liquid, and the rest of the particles may be surfaced with material which is selectively wetted by the other liquid. It is the function of the magnetic particles to provide a large surface which is alternately exposed to contact with one liquid and at once moved at high relative angular velocity through the other liquid, this movement producing minimum of disturbance to the separation produced by centrifugal action.

In order to prevent the magnetic particles leaving the apparatus with the outlet streams, the perforations 9, 10 may be made smaller than the dimensions of the magnetic particles and the pipe 25 may be provided with a screen of sufficient fineness as to prevent magnetic particles from flowing into its inlet. Alternatively, the zones at which the light and heavy liquids enter and leave the vessel may be formed from non-magnetic material so that the solid particles are separated from the liquid by centrifugal force and pulled lineally toward the center of the vessel thus freeing the liquid outlet streams of them.

While the invention has been described in connection with a present, preferred embodiment thereof, it is to be understood that this description is illustrative only and is not intended to limit the invention, the scope of which is defined by the appended claims.

Having described my invention, I claim:

1. In the art of liquid-liquid contacting, the steps which comprise effecting countercurrent flow of a light liquid and a heavy liquid through a mixing zone, effecting rotary movement of the liquids as they pass through the mixing zone to establish an interface between zones of light and heavy liquids, introducing magnetic particles into the mixing zone, and periodically establishing a magnetic field in the mixing zone of such character as to force the magnetic particles toward the zone of light liquid, said particles being moved toward the zone of heavy liquid by the action of centrifugal force when the magnetic field is released.

2. In the art of liquid-liquid contacting, the steps which comprise admitting light liquid and withdrawing heavy liquid at one end of a mixing zone, admitting heavy liquid and withdrawing light liquid at the other end of said mixing zone, effecting rotary movement of the liquids as they pass through the mixing zones in such fashion that an interface is formed between bodies of light and heavy liquid, passing particles of magnetic material from the body of light liquid to the body of heavy liquid under the action of centrifugal force, and periodically establishing a magnetic field in the mixing zone to force said magnetic particles from the body of heavy liquid to the body of light liquid.

3. In the art of liquid-liquid contacting, the steps which comprise admitting light liquid and withdrawing heavy liquid at one end of a mixing zone, admitting heavy liquid and withdrawing light liquid at the other end of said mixing zone, effecting rotary movement of the liquids as they pass through the mixing zone in such fashion that an interface is formed between bodies of light and heavy liquid, passing magnetic particles at high velocity from the body of light liquid through the interface to the body of heavy liquid under the action of centrifugal force, and periodically establishing a magnetic field in the mixing zone to return said particles from the body of heavy liquid through the interface to the body of light liquid.

4. In the art of liquid-liquid contacting, the steps which comprise admitting light liquid and withdrawing heavy liquid at one end of a mixing zone, admitting heavy liquid and withdrawing light liquid at the other end of said mixing zone, effecting rotary movement of the liquids as they pass through the mixing zone in such fashion that an interface is formed between bodies of light and heavy liquid, passing magnetic particles at high velocity from the body of light liquid through the interface to the body of heavy liquid under the action of centrifugal force, periodically establishing a magnetic field in the mixing zone to return said particles from the body of heavy liquid through the interface to the body of light liquid, and controlling the location of the interface by varying the back pressure at the heavy liquid withdrawal zone and the light liquid withdrawal zone.

5. In a liquid-liquid contacting apparatus, an elongated vessel of magnetic material having an inlet for light liquid and an outlet for heavy liquid at one end thereof, said vessel having an outlet for light liquid and an inlet for heavy liquid at the other end thereof, means for effecting rotary movement of the light and heavy liquids in said vessel to establish an interface therein between an inner zone of light liquid and an outer zone of heavy liquid, a longitudinal magnetic member in said vessel, a coil secured to said vessel for establishing a magnetic field in said vessel and said magnetic member directed radially inwardly from the periphery toward the center of the vessel, and a mass of magnetic particles in said vessel.

6. In a liquid-liquid contacting apparatus, an elongated generally cylindrical vessel formed from magnetic material, caps secured to opposite ends of said vessel, a central longitudinally extending magnetic member disposed between said end caps, a rotary pressure joint for admitting light liquid and withdrawing heavy liquid at one end of said vessel, a rotary pressure joint for withdrawing light liquid and admitting heavy liquid at the other end of said vessel, means for rotating said vessel about its longitudinal axis, and a coil for establishing a magnetic field in said vessel and said magnetic member which is directed radially inward from the periphery toward the center of the vessel.

7. In a liquid-liquid contacting apparatus, an elongated generally cylindrical vessel formed from magnetic material, caps secured to opposite ends of said vessel, a central longitudinally extending magnetic member disposed between said end caps, a rotary pressure joint for admitting light liquid and withdrawing heavy liquid at one end of said vessel, a rotary pressure joint for withdrawing light liquid and admitting heavy liquid at the other end of said vessel, means for rotating said vessel about its longitudinal axis, a mass of magnetic particles in said vessel, and a coil for establishing a magnetic field in said vessel and said magnetic member which is directed radially inward from the periphery toward the center of the vessel.

8. In apparatus for liquid-liquid contacting, an elongated generally cylindrical vessel formed from magnetic material, spaced caps at opposite ends of said vessel, a shaft of magnetic material extending axially of said vessel and disposed between said end caps, a rotary pressure joint assembly at one end of said vessel for admitting heavy liquid to the peripheral region of said vessel and for withdrawing light liquid from the central region of said vessel, said shaft being perforated to permit light liquid to flow into said pressure joint assembly, a rotary pressure joint assembly at the other end of said casing for withdrawing heavy liquid from the peripheral region of the vessel and for discharging light liquid into the central region of the vessel, said sleeve being perforated to permit light liquid to be discharged therethrough, means for effecting rotation of said vessel about its longitudinal axis, a mass of magnetic particles in said vessel, a solenoid coil mounted adjacent one of said end plates to establish a magnetic field in said vessel and said magnetic shaft which is directed radially from the periphery toward the center of said vessel, and slip rings for supplying electrical energy to said coil.

9. In apparatus for liquid-liquid contacting, an elongated generally cylindrical vessel formed from magnetic material, spaced caps at opposite ends of said vessel, a shaft of magnetic material extending axially of said vessel and disposed between said end caps, a rotary pressure joint assembly at one end of said vessel for admitting heavy liquid to the peripheral region of said vessel and for withdrawing light liquid from the central region of said vessel, said sleeve being perforated to permit light liquid to flow into said pressure joint assembly, a rotary pressure joint assembly at the other end of said casing for withdrawing heavy liquid from the peripheral region of the vessel and for discharging light liquid into the central region of the vessel, said sleeve being perforated to permit light liquid to be discharged therethrough, means for effecting rotation of said vessel about its longitudinal axis, a mass of magnetic particles in said vessel, a solenoid coil mounted adjacent one of said end plates to establish a magnetic field in said vessel and said magnetic shaft which is directed radially from the periphery toward the center of said vessel, slip rings for supplying electrical energy to said coil, and pressure regulating means for controlling the back pressures of light and heavy liquids withdrawn from said vessel.

SAMUEL C. CARNEY.

REFERENCES CITED

The following references are of record in the file of this patent:

UNITED STATES PATENTS

| Number | Name | Date |
| --- | --- | --- |
| 1,043,349 | Ostwald | Nov. 5, 1912 |
| 2,029,687 | Wilson | Feb. 4, 1936 |
| 2,037,318 | Fenske et al. | Apr. 14, 1936 |
| 2,236,769 | Armbruster | Apr. 1, 1941 |
| 2,398,725 | Schutte | Apr. 16, 1946 |
| 2,474,006 | Maycock | June 21, 1949 |

FOREIGN PATENTS

| Number | Country | Date |
| --- | --- | --- |
| 12,279 | Great Britain | Nov. 2, 1895 |